United States Patent
Papadopoulos (10) Patent No.: US 11,070,092 B2
(45) Date of Patent: Jul. 20, 2021

(54) METHOD AND APPARATUS FOR RADIO-FREQUENCY POWER HARVESTING CONTROL

(71) Applicant: Atmosic Technologies Inc., Campbell, CA (US)

(72) Inventor: Dimitrios Filippos Papadopoulos, Belmont, CA (US)

(73) Assignee: Atmosic Technologies Inc., Campbell, CA (US)

( * ) Notice: Subject to any disclaimer, the term of this patent is extended or adjusted under 35 U.S.C. 154(b) by 302 days.

(21) Appl. No.: 16/384,195

(22) Filed: Apr. 15, 2019

(65) Prior Publication Data

US 2020/0076240 A1   Mar. 5, 2020

Related U.S. Application Data

(60) Provisional application No. 62/726,541, filed on Sep. 4, 2018.

(51) Int. Cl.
| | |
|---|---|
| *H01M 10/44* | (2006.01) |
| *H01M 10/46* | (2006.01) |
| *H02J 50/20* | (2016.01) |
| *H02J 7/02* | (2016.01) |
| *H02J 7/06* | (2006.01) |
| *H02J 7/10* | (2006.01) |

(52) U.S. Cl.
CPC .............. *H02J 50/20* (2016.02); *H02J 7/025* (2013.01); *H02J 7/06* (2013.01); *H02J 2007/10* (2013.01)

(58) Field of Classification Search
CPC ........ H02J 50/20; H02J 50/402; H02J 50/001; H02J 7/06; H02J 7/007; H02J 7/007186; H04Q 2209/88; H04Q 2209/886; H04Q 2209/40

USPC .................. 320/103, 107, 108, 138; 307/104
See application file for complete search history.

(56) References Cited

U.S. PATENT DOCUMENTS

| | | | |
|---|---|---|---|
| 7,592,831 B2 | 9/2009 | Locatelli et al. | |
| 9,800,170 B2 | 10/2017 | Shao | |
| 2009/0083556 A1* | 3/2009 | Zimek | H02M 1/10 713/310 |
| 2011/0307910 A1* | 12/2011 | Nagasato | H02M 1/32 720/695 |

OTHER PUBLICATIONS

Estrada-López, Johan, et al. "Multiple Input Energy Harvesting Systems for Autonomous loT End-Nodes." Journal of Low Power Electronics and Applications 8.1 (2018): 6, pp. 1-14.
Agrawal Sachin, et al. "A dual-band RF energy harvesting circuit using 4th order dual-band matching network." Cogent Engineering 4.1 (2017): 1332705, pp. 1-10.

\* cited by examiner

*Primary Examiner* — Edward Tso
(74) *Attorney, Agent, or Firm* — Paradice & Li LLP (57) ABSTRACT

This disclosure provides a method and apparatus for controlling a plurality of radio-frequency (RF) power harvesters configured to generate power from received RF signals. A controller may monitor output power from the RF power harvesters and a sequence of reset signals. Based on the output powers and the sequence of reset signals, the controller may couple the RF power harvesters to a charge-storage device and one or more voltage regulators. In some implementations, the controller may also monitor RF envelope amplitude and couple the RF power harvesters to the charge storage device based on RF envelope amplitude.

24 Claims, 6 Drawing Sheets

METHOD AND APPARATUS FOR RADIO-FREQUENCY POWER HARVESTING CONTROL

CROSS-REFERENCE TO RELATED APPLICATION

This application claims the benefit of co-pending and commonly owned U.S. Provisional Patent Application No. 62/726,541 entitled "METHOD AND APPARATUS FOR RADIO FREQUENCY POWER HARVESTING CONTROL" filed on Sep. 4, 2018, the entirety of which is hereby incorporated by reference.

TECHNICAL FIELD

The present embodiments relate generally to wireless devices powered at least in part by power harvested from radio-frequency (RF) energy, and specifically to methods and apparatuses for controlling operations of RF power harvesters.

BACKGROUND OF RELATED ART

Wireless devices (such as Wi-Fi devices, Bluetooth devices, wireless sensors, and IoT devices and the like) may be battery powered to provide mobility and convenience. Reducing the power consumption of wireless devices may extend battery life and thereby increase the time between battery recharging or replacement. Due to device size constraints, the batteries of wireless devices may have limited power capacities, or, in some instances, the wireless device may not include any battery.

Some wireless devices may include a plurality of radio-frequency (RF) power harvesters that capture and convert RF energy into power, such as direct current (DC) power. Controlling the operation of the plurality of RF power harvesters, particularly when starting from a zero or near zero power state (e.g., when no RF power is being harvested because of little or no nearby RF activity), may be difficult because there may be no power available with which to power any control logic associated with controlling operation of the RF power harvesters.

Thus, there is a need to intelligently control operations associated with RF power harvesters, especially when operating at a zero or near zero power state.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter described herein may be implemented as an apparatus for controlling power harvesters. The apparatus may include a first power harvester configured to generate a first unregulated voltage from a first radio-frequency (RF) signal and a second power harvester configured to generate a second unregulated voltage from a second RF signal. Further, the apparatus may include a reset signal generator configured to generate a sequence of reset signals and a switch controller. The switch controller may be configured to couple the first power harvester and the second power harvester to a charge-storage device based at least in part on the first unregulated voltage, the second unregulated voltage, and the sequence of reset signals.

Another aspect of the subject matter of this disclosure may be implemented as a method. The method may include generating, by a first power harvester, a first unregulated voltage, generating, by a second power harvester, a second unregulated voltage, and generating, by a reset signal generator, a sequence of reset signals. The method may also include coupling the first power harvester and the second power harvester to a charge-storage device based at least in part on the first unregulated voltage, the second unregulated voltage, and the sequence of reset signals.

Another innovative aspect of the subject matter described in this disclosure may be implemented as another apparatus. The apparatus may include a means for generating, by a first power harvester, a first unregulated voltage, a means for generating, by a second power harvester, a second unregulated voltage, and a means for generating, by a reset signal generator, a sequence of reset signals. The method may also include a means for coupling the first power harvester and the second power harvester to a charge-storage device based at least in part on the first unregulated voltage, the second unregulated voltage, and the sequence of reset signals.

BRIEF DESCRIPTION OF THE DRAWINGS

Aspects of the present disclosure are illustrated by way of example and are not intended to be limited by the figures of the accompanying drawings. Like numbers reference like elements throughout the drawings and specification.

DETAILED DESCRIPTION

In the following description, numerous specific details are set forth such as examples of specific components, circuits, and processes to provide a thorough understanding of the disclosure. The term "coupled" as used herein means coupled directly to or coupled through one or more intervening components or circuits. Also, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example embodiments are not to be construed as limited to specific examples described herein but rather to include within their scope all embodiments defined by the appended claims.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory computer-readable storage medium comprising instructions that, when executed, performs one or more of the methods described below. The non-transitory computer-readable storage medium may form part of a computer program product, which may include packaging materials.

The non-transitory computer-readable storage medium may include random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a computer-readable communication medium that carries or communicates code in the form of instructions or data structures and that may be accessed, read, and/or executed by a computer or other processor.

The various illustrative logical blocks, modules, circuits and instructions described in connection with the implementations disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general-purpose processor may be a microprocessor, but in the alternative, the processor may be any conventional processor, controller, microcontroller, or state machine. A processor may also be implemented as a combination of computing devices (such as a combination of a DSP and a microprocessor), a plurality of microprocessors, one or more microprocessors in conjunction with a DSP core, or any other suitable configuration.

Figure 1:
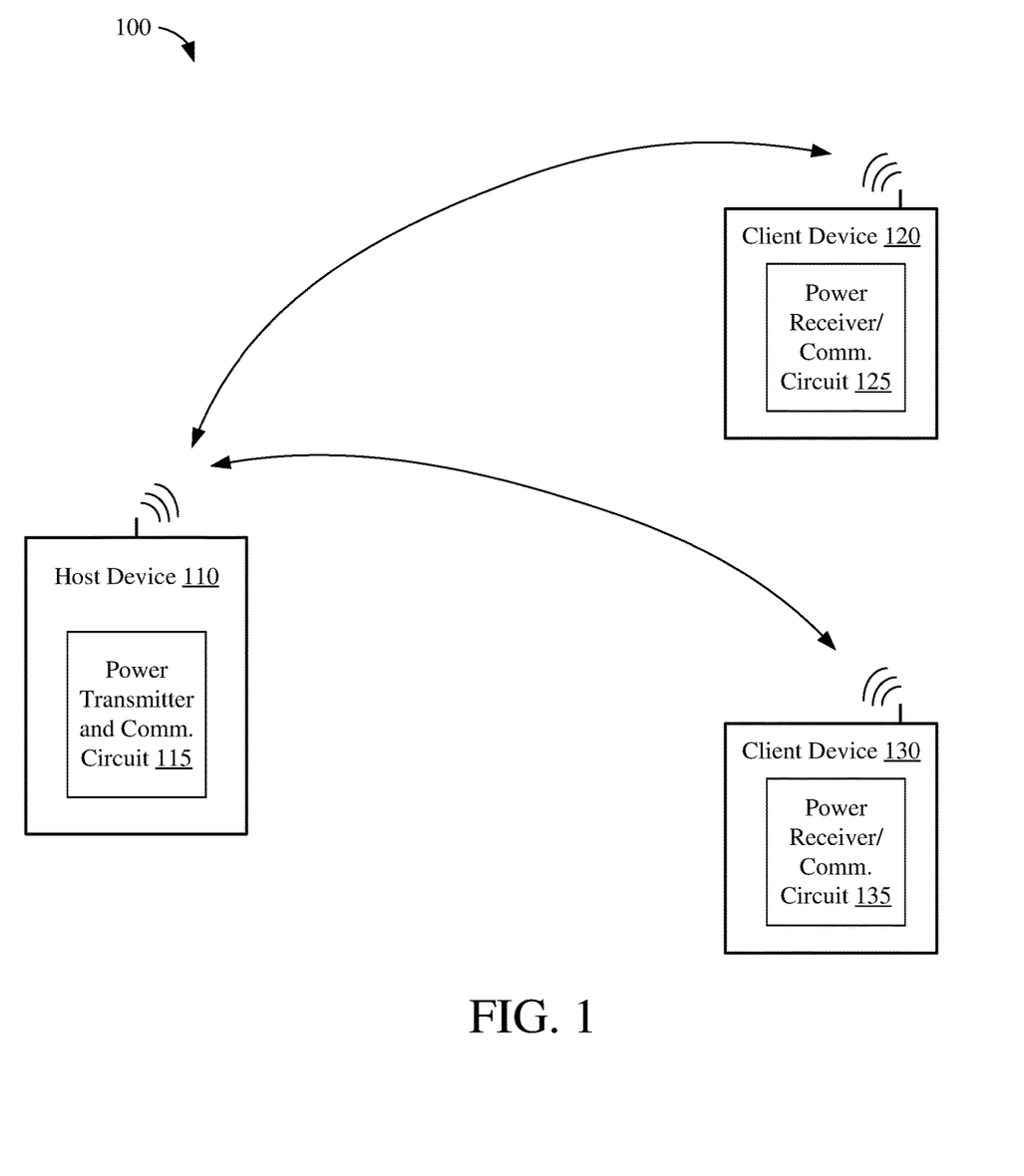
FIG. 1 depicts a wireless communication system within which aspects of the present disclosure may be implemented.

FIG. 1 depicts a wireless communication system 100 within which aspects of the present disclosure may be implemented. The wireless communication system 100 may include one or more wireless communication devices such as a host device 110 and client devices 120 and 130. The host device 110 and the client devices 120 and 130 may be any suitable wireless communication device. Example wireless communication devices may include a cell phone, personal digital assistant (PDA), tablet device, laptop computer, or any other suitable portable device. The host device 110 and the client devices 120 and 130 may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

For ease of explanation and clarity, the wireless communication system 100 depicts a single host device 110 and two client devices 120 and 130. In other embodiments, the wireless communication system 100 may include any technically feasible number of host devices and/or client devices. The host device 110 and the client devices 120 and 130 may communicate with each other via one or more technically feasible wireless communication protocols. In some implementations, the host device 110 and the client devices 120 and 130 may communicate with each other (and with other devices not shown for simplicity) via Wi-Fi, Bluetooth®, Bluetooth Low Energy (BLE), Long Term Evolution (LTE), or any other suitable communication protocol. In some other implementations, the host device 110 and client devices 120 and 130 may operate within the 900 MHz band, the 2.4 GHz industrial, scientific, and medical (ISM) band, the 5 GHz ISM band, the 60 GHz band or any other technically feasible frequency band.

In some implementations, the client devices 120 and 130 may not be battery powered or externally powered, but may instead derive power from RF energy transmitted by other devices and received by the client devices 120 and 130. For example, the client devices 120 and 130 may be small, remote devices for which battery and/or external power sources are not feasible, available, or desirable. In some aspects, the client devices 120 and 130 may be environmental sensors (such as temperature sensors, air pressure sensors, humidity sensors, etc.), door position sensors, window position sensors, and the like. In other aspects, the client devices 120 and 130 may be any suitable IoT device (such as sensors, motion detectors, relay devices, and the like).

In some implementations, the client device 120 may include a power receiver/communication circuit 125. The power receiver/communication circuit 125 may receive RF energy from the host device 110 (or any other nearby device that transmits or emits RF energy) and convert the RF energy into power (such as voltage/current) for the client device 120. In this manner, some or all of the operations of the client device 120 may be powered by RF energy transmitted from the host device 110. In addition, the power receiver/communication circuit 125 may provide communication functionality for the client device 120. For example, the power receiver/communication circuit 125 may include a transceiver to wirelessly transmit and receive data between the client device 120 and the host device 110, between the client device 120 and the client device 130, and/or between the client device 120 and one or more other wireless devices (not shown for simplicity). Similar to the client device 120, the client device 130 may also include a power receiver/communication circuit 135 to convert RF energy into power and provide communication functionality.

In some implementations, the host device 110 may be powered by a battery or through an external power source, for example, and be well-suited to transmit power via RF energy to the client devices 120 and/or 130. In some implementations, the host device 110 may include a power transmitter/communication circuit 115. The power transmitter/communication circuit 115 may convert power from a local power source (such as battery power and/or an external power source, not shown for simplicity) into RF energy that may be transmitted to other wireless devices (such as the client devices 120 and 130). In addition, the power transmitter/communication circuit 115 may provide communication functionality for the host device 110. For example, the power transmitter/communication circuit 115 may include a transceiver to wirelessly transmit and receive data between the host device 110 and a number of other devices (such as the client devices 120 and 130).

In some aspects, the RF signal may be transmitted within frequency bands that may be shared with other transceivers provided within the client devices 120 and 130, respectively. For one example, the client devices 120 and 130 may include one or more transceivers (including Wi-Fi and Bluetooth transceivers) that operate within a 6 MHz, a 13 MHz, a 27 MHz, a 40 MHz, a 400 MHz, a 900 MHz, a 2.4 GHz, a 5 GHz, and a 60 GHz industrial, scientific, and medical (ISM) band. In another example, the client devices 120 and 130 may include one or more cellular transceivers that operate within various frequency bands (some of which may overlap frequency bands used by the one or more Wi-Fi and/or Bluetooth transceivers). Thus, the RF signal and the power receiver/communication circuits 125 and 135 of respective client devices 120 and 130 may share an ISM band used by other transceivers of the respective client devices 120 and 130.

In some implementations, the RF signal may not be associated with any commercially available communication protocol (such as Wi-Fi and Bluetooth communication protocols), but instead may be based on a signaling technique independent of commercially available communication protocols (such as a proprietary or military communication protocol).

In some implementations, the power receiver/communication circuits 125 and 135 may each include a plurality of RF power harvesters. Each RF power harvester may convert RF energy into power, such as direct-current (DC) power, to power some or all of the associated client device. However, controlling operation of the plurality of RF power harvesters beginning at a zero or low power state may be difficult since there may be insufficient power available with which to power logic or circuits associated with controlling operations of the RF power harvesters.

Figure 2:
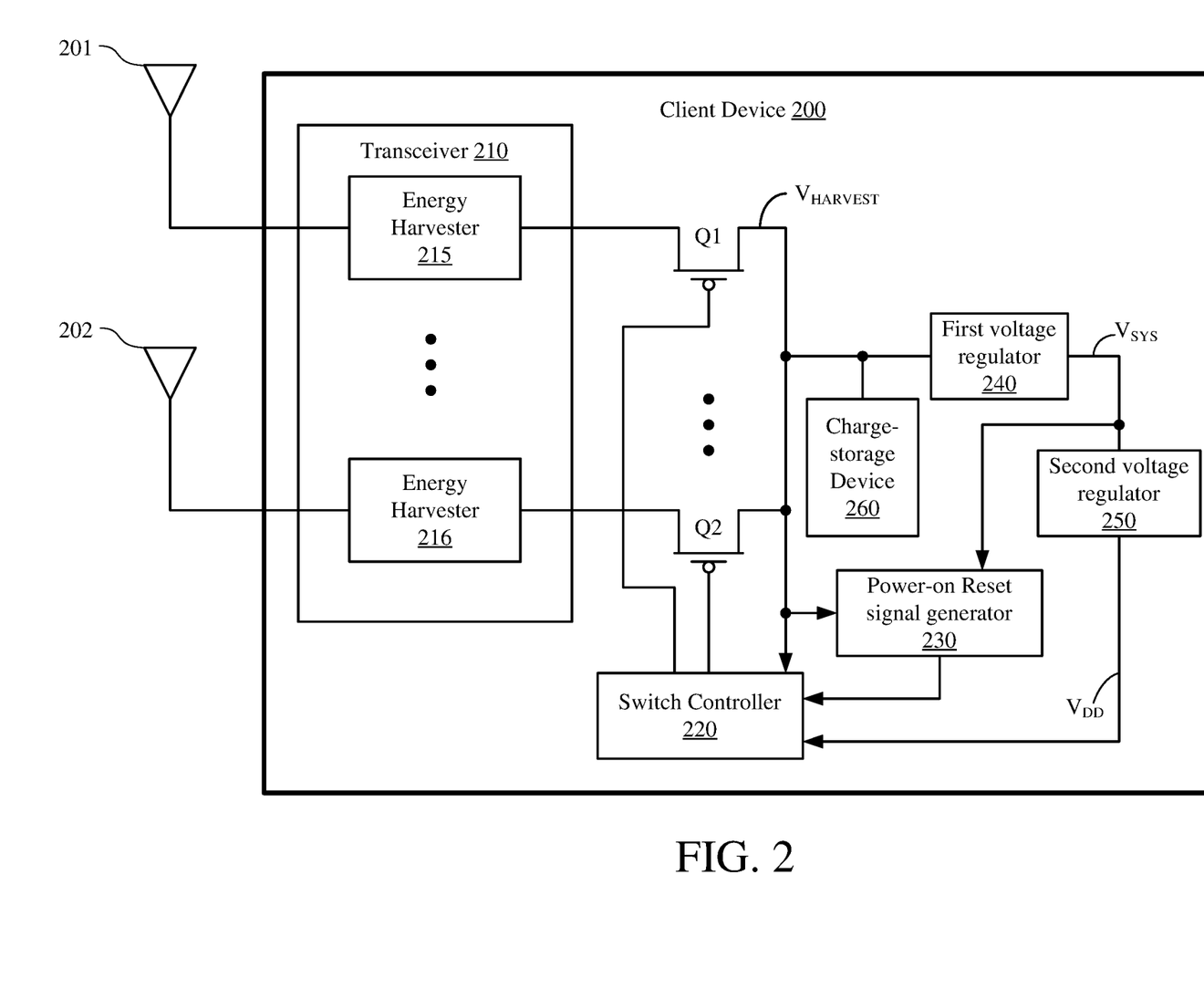
FIG. 2 is a simplified block diagram of an example client device.

FIG. 2 is a simplified block diagram of an example client device 200. The client device 200 may be an implementation of the client device 120 and/or the client device 130 of FIG. 1. The client device 200 may include antennas 201 and 202, a transceiver 210, a switch controller 220, a power-on reset signal generator 230, a first voltage regulator 240, a second voltage regulator 250, a charge-storage device 260, a first transistor Q1, and a second transistor Q2. Although two antennas 201 and 202 are shown in the example of FIG. 2, in other implementations, the client device 200 may include any feasible number of antennas. Furthermore, the transceiver 210 may be an implementation of the power receiver/communication circuits 125 and 135 of respective client devices 120 and 130 of FIG. 1.

The transceiver 210 may include a first power harvester 215 and a second power harvester 216. The first power harvester 215 may be coupled to, and receive RF energy from, the first antenna 201. Similarly, the second power harvester 216 may be coupled to, and receive RF energy from, the second antenna 202. The first power harvester 215 and the second power harvester 216 may convert RF energy into power (e.g., a voltage and/or current) to power, at least partially, the client device 200. Thus, the first power harvester 215 may generate a first unregulated power, and the second power harvester 216 may generate a second unregulated power. In the example of FIG. 2, the first antenna 201 is coupled to the first power harvester 215, and the second antenna 202 is coupled to the second power harvester 216, however other arrangements are contemplated. Additionally, the client device 200 also may include an antenna routing switch (not shown for simplicity) to flexibly couple any feasible antenna to any feasible power harvester. In addition to converting RF energy, the first power harvester 215 and the second power harvester 216 also may provide RF envelope information associated with the received RF signal. The RF envelope information may indicate a magnitude, power density or the like associated with the RF signal. Further, although the transceiver 210 is shown in the example of FIG. 2 as including only two power harvesters, in other implementations, the transceiver 210 may include any technically feasible number of power harvesters. Also, although the client device 200 is shown in the example of FIG. 2 as including only one transceiver 210, in other implementations, the client device 200 may include any technically feasible number of transceivers.

The first unregulated power provided by the first power harvester 215 may be provided to the charge-storage device 260 through the first transistor Q1. Similarly, the second unregulated power provided by the second power harvester 216 may be provided to the charge-storage device 260 through the second transistor Q2. In the example of FIG. 2, the first transistor Q1 and the second transistor Q2 are depicted as PMOS transistors. In other implementations, the first transistor Q1 and the second transistor Q2 may be NMOS transistors, bipolar junction transistors (BJTs), or any other feasible semiconductor or mechanical switch.

The charge-storage device 260 may provide temporary power storage for energy provided by the first power harvester 215 and the second power harvester 216. In some example implementations, the charge-storage device 260 may include a capacitor, a super capacitor, a battery or the like. In some other example implementations, power produced by the first power harvester 215 and the second power harvester 216 may be proportional to the captured or received RF energy and may be an unregulated voltage (denoted as $V_{HARVEST}$ in FIG. 2). Initially, for example, when the client device 200 is first powered on (or otherwise enabled for operation), or when no RF energy has been received for an extended period of time, no power may have been produced by the first power harvester 215 or the second power harvester 216. Since no power has been produced, the charge-storage device 260 may be depleted.

In some implementations, different power harvesters may be optimized to operate within different frequency ranges. For one example, the first power harvester 215 may be optimized to convert RF energy within a 900 MHz frequency band, and the second power harvester 216 may be optimized to convert RF energy with the 2.4 GHz frequency band. For another example, the first power harvester 215 may be optimized to convert RF energy within the 900 MHz frequency band, and the second power harvester 216 may be optimized to convert RF energy with the 5 GHz frequency band. For yet another example, the first power harvester 215 may be optimized to convert RF energy within the 2.4 GHz frequency band, and the second power harvester 216 may be optimized to convert RF energy with the 5 GHz frequency band. Optimization for other frequency bands is contemplated. The inclusion of multiple power harvesters optimized for different frequency bands may enable the client device 200 to more effectively convert RF energy into power from a wider range of frequencies, for example, compared to a client device that includes only one power harvester.

In some other implementations, the first power harvester 215 and second power harvester 216 may both be optimized to convert RF energy within the same frequency band. For example, first power harvester 215 and second power harvester 216 may both be optimized to operate in the 2.4 GHz frequency band, however other frequency bands are possible. In another implementation, the first power harvester 215 and the second power harvester 216 may be configured to receive different power levels of RF signals. For example, the first power harvester 215 may be configured to receive RF signals between −20 dBm and −30 dBm, and the second power harvester 216 may be configured to receive signals between 0 dBm to −10 dBm. In this manner, different power harvesters may be used to receive relatively strong RF signals and relatively weak RF signals, but within a shared frequency band. The use of separate power harvesters configured for different RF power levels may involve a trade-off between sensitivity and circuit complexity. For example, a power harvester configured to receive and convert relatively strong RF signals into power may have less sensitivity than power harvesters configured to receive and convert relatively weak RF signals into power. In contrast, a power harvester configured to receive and convert relatively weak RF signals into power may include additional circuitry to provide protection from strong RF signals.

Power from the charge-storage device 260 may be provided to the first voltage regulator 240. In some example implementations, the first voltage regulator 240 may be a boost converter that receives the $V_{HARVEST}$ voltage and generates a first regulated voltage. The first regulated voltage (denoted as $V_{SYS}$ in FIG. 2) may be a system voltage and may be provided to any number of circuits within the client device 200, including, for example, the second voltage regulator 250 and the power-on reset signal generator 230. The second voltage regulator 250 may receive the first regulated voltage and generate a second regulated voltage based at least in part on the first regulated voltage. The second regulated voltage (denoted as $V_{DD}$ in FIG. 2) may be a lower voltage than the first regulated voltage, and may power one or more circuits (including digital circuits) within the client device 200 including, for example, the switch controller 220. In other example implementations, the second regulated voltage may be a higher voltage than the first regulated voltage.

The switch controller 220 may control operation of the first transistor Q1 and the second transistor Q2 based on an unregulated voltage ($V_{HARVEST}$) provided by the first power harvester 215 and/or the second power harvester 216, the second regulated voltage ($V_{DD}$) provided by the second voltage regulator 250, and a plurality of power-on reset (POR) signals from the power-on reset signal generator 230. In some aspects, the switch controller 220 may couple the first power harvester 215 and the second power harvester 216 to the charge-storage device 260 and/or to the first voltage regulator 240 through the first transistor Q1 and the second transistor Q2, respectively. In some aspects, the switch controller 220 may enable the first transistor Q1 and/or the second transistor Q2 to transfer power before the first regulated voltage and/or the second regulated voltage become stable. Operation of the switch controller 220 is described in more detail below in conjunction with FIGS. 3-4.

The power-on reset signal generator 230 may generate the plurality of POR signals based on the voltage $V_{HARVEST}$ provided by the first power harvester 215 and/or the second power harvester 216 and the first regulated voltage ($V_{SYS}$) from the first voltage regulator 240. In some example implementations, the power-on reset signal generator 230 may generate and sequence a plurality of POR signals that may enable the switch controller 220 to store power via the charge-storage device 260 before the first regulated voltage and the second regulated voltage become stable. Operation of the power-on reset signal generator 230 is described in more detail below in conjunction with FIG. 5.

Figure 3:
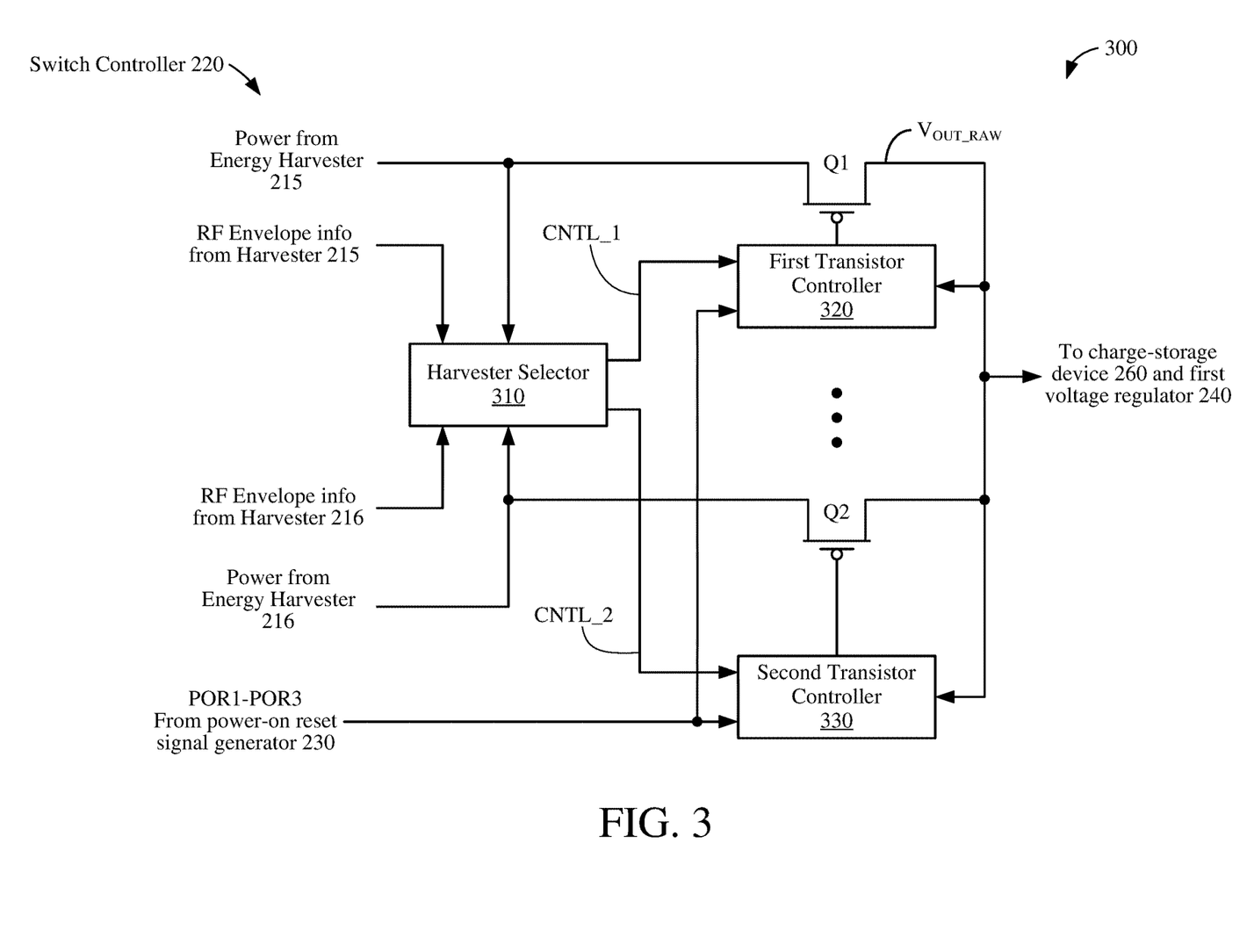
FIG. 3 is a simplified block diagram of the switch controller of FIG. 2.

FIG. 3 is a simplified block diagram 300 of the switch controller 220 of FIG. 2. The switch controller 220 may include a harvester selector 310, a first transistor controller 320, and a second transistor controller 330. The block diagram 300 may depict additional detail omitted from FIG. 2 for clarity. The first transistor Q1 and the second transistor Q2 of FIG. 2 are replicated in FIG. 3 for ease of explanation. The first transistor controller 320 may be coupled to the first transistor Q1, and the second transistor controller 330 may be coupled to the second transistor Q2. In other implementations, the switch controller 220 may include any feasible number of transistors and transistor controllers. Further, in other implementations, the first transistor controller 320 and the second transistor controller 330 may be combined into a single unit.

The power-on reset signal generator 230 (not shown for simplicity) may generate a first POR signal (POR1), a second POR signal (POR2), and a third POR signal (POR3). The first transistor controller 320 may receive POR signals POR1-POR3 from the power-on reset signal generator 230, an unregulated voltage (e.g., $V_{HARVEST}$) from one or more power harvesters, and control signals (denoted CNTL_1 and CNTL_2 in FIG. 3) provided by the harvester selector 310. For the example of FIG. 3, the first transistor Q1 is depicted as a PMOS transistor. For some PMOS transistors, when a gate voltage is at or near zero volts, a conducting channel may form between the PMOS transistor's source and drain regions. The first transistor controller 320 may provide a gate voltage at or near zero volts to the first transistor Q1 when the client device 200 is first powering up (e.g., which may be determined or signaled by the POR signals), or when power from an associated power harvester (e.g., $V_{HARVEST}$) is ramping up from zero or near zero volts. In this manner, energy may be provided to the charge-storage device 260 and the first voltage regulator 240 (not shown for simplicity) when the harvested energy becomes available. Operations of the second transistor controller 330 may be similar to operations of the first transistor controller 320 described above. As shown, power provided by the first power harvester 215 and the second power harvester 216 may be provided to the harvest selector 310.

During operations, when the first power harvester 215 and the second power harvester 216 are both active (e.g., harvesting energy from RF signals), each power harvester may produce different amounts of power (e.g., different voltage levels). In such conditions, if both the first transistor Q1 and the second transistor Q2 are conducting, then power from one power harvester may be lost (e.g., dissipated) through the other power harvester. For example, if the voltage from the first power harvester 215 is greater than the voltage from the second power harvester 216, then energy from the first power harvester 215 may be lost through the second power harvester 216.

To reduce such energy loss, the harvester selector 310 may monitor power provided by the power harvesters 215 and 216 and/or RF envelope information associated with each of the power harvesters 215 and 216 to determine which of the power harvesters 215 and/or 216 to couple to the charge-storage device 260 and/or to the first voltage regulator 240. In some implementations, the harvester selector 310 may couple the power harvesters 215 and 216 to the charge-storage device 260 and/or to the first voltage regulator 240, may isolate the power harvesters 215 and 216 from the charge-storage device 260 and/or the first voltage regulator 240, or may isolate the power harvesters 215 and 216 from each other (or any combination thereof) by controlling the first transistor Q1 and the second transistor Q2 through respective transistor controllers 320 and 330 and control signals CNTL_1 and CNTL_2. In addition, or in the alternative, other suitable signals, events, or operating conditions may be used by the harvester selector 310 to either couple one or both of the power harvesters 215 and 216 to other circuits or devices, or isolate one or both of the power harvesters 215 and 216 from other circuits or devices.

For example, if the first power harvester 215 is generating more power (e.g., voltage) than the second power harvester 216, then the harvester selector 310 may couple the first power harvester 215 to the charge-storage device 260 and isolate the second power harvester 216 from the charge-storage device 260 and the first power harvester 215. In some implementations, the harvester selector 310 may also isolate the second power harvester 216 from the first power harvester 215. In another example, if the second power harvester 216 is generating more power than the first power harvester 215, then the harvester selector 310 may couple the second power harvester 216 to the charge-storage device 260 and isolate the first power harvester 215 from the charge-storage device 260 and the second power harvester 216. In some implementations, the harvester selector 310 may also isolate the first power harvester 215 from the second power harvester 216. In some implementations, the higher power level may exceed the lower power level by at least a threshold amount before the harvester selector 310 selectively couples and isolates the power harvesters as described above.

Alternatively, or in addition to monitoring harvester output power, the harvester selector 310 may monitor RF envelope information associated with each of the power harvesters 215 and 216. Thus, the harvester selector 310 may receive RF envelope information associated with the size of an RF signal received by the first power harvester 215 and the size of an RF signal received by the second power harvester 216. Because the power harvesters 215 and 216 may generate more power from a larger RF envelope, the harvester selector 310 may couple the power harvester associated with the larger RF envelope to the charge-storage device 260 and/or the first voltage regulator 240, and may isolate the power harvester associated with the smaller RF envelope. In some implementations, the size of the larger RF envelope may exceed the size of the smaller RF envelope by at least a threshold amount before the harvester selector 310 selectively couples and isolates the power harvesters occurs as described above.

Figure 4:
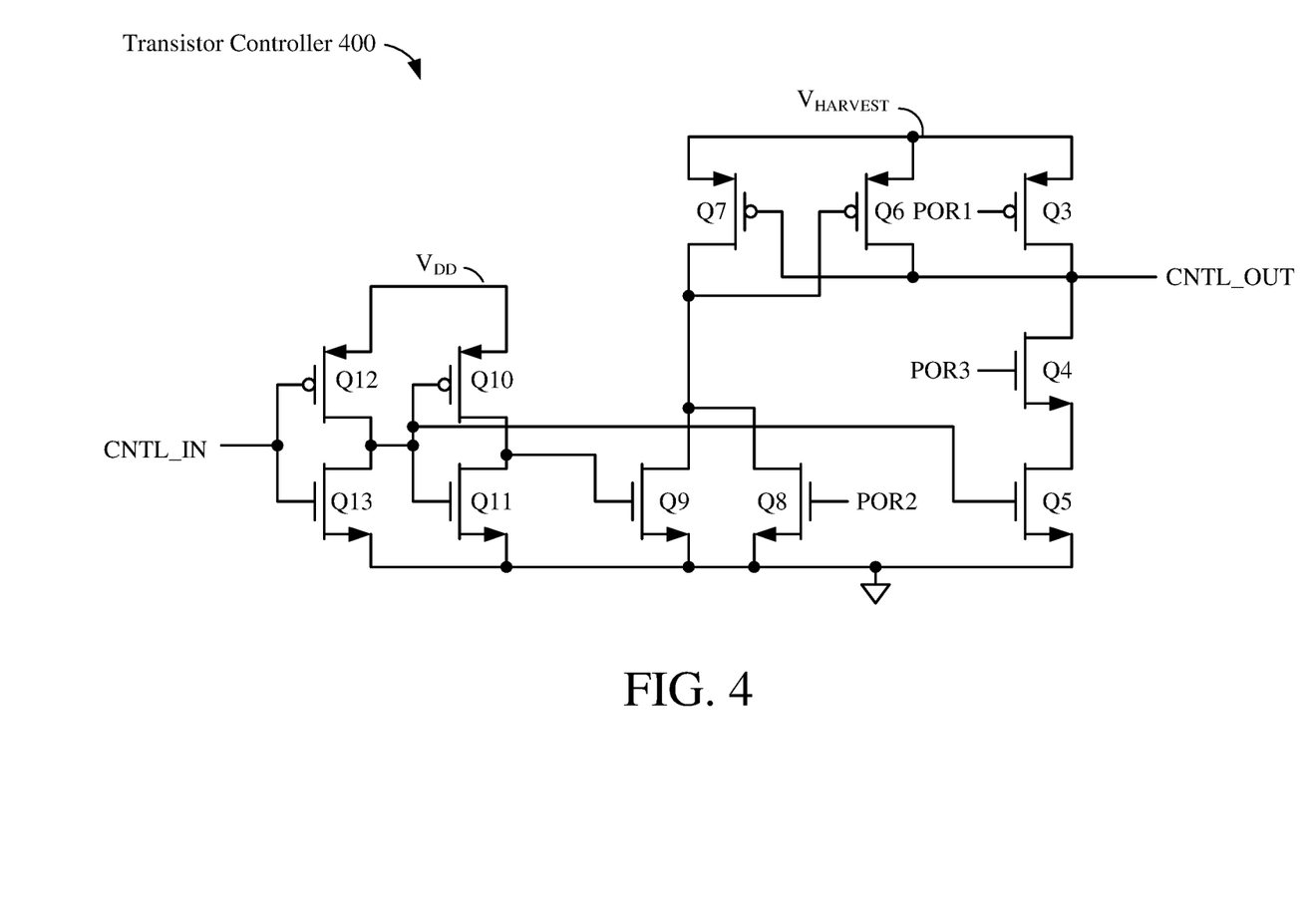
FIG. 4 is a simplified schematic diagram of the transistor controller of FIG. 3.

FIG. 4 is a simplified schematic diagram of a transistor controller 400. The transistor controller 400 may be an implementation of the transistor controller 320 or the transistor controller 330 of FIG. 3. Thus, the transistor controller 400 may be coupled to the first transistor Q1 or the second transistor Q2 as shown in FIG. 3. The transistor controller 400 may include a plurality of transistors Q3-Q13. Operation of the transistor controller 400 may be determined at least in part by the POR signals (POR1-POR3), a control signal (CNTL_IN) provided by the harvester selector 310 of FIG. 3, the unregulated voltage $V_{HARVEST}$, the second regulated voltage ($V_{DD}$), and the plurality of transistors Q3-Q13. The POR signals, which may be provided by the power-on reset signal generator 230 (not shown for simplicity), may be asserted in a sequence. The sequence of the POR signals is described in more detail below in conjunction with FIG. 5. The transistor controller 400 may control an associated transistor (e.g., transistor Q1 or transistor Q2 of FIG. 2) through a CNTL_OUT signal. Further, the CNTL_IN signal may be an implementation of the CNTL_1 signal or the CNTL_2 signal of FIG. 3.

To begin, the client device 200 may be in a reset mode as RF signals are first received, and $V_{HARVEST}$ and $V_{DD}$ are at or near zero volts. Accordingly, the CNTL_OUT signal may initially be at or near zero volts. The associated transistor controlled by the CNTL_OUT signal (e.g., transistor Q1 or Q2) may conduct and allow power provided by the first power harvester 215 or the second power harvester 216 accumulate via the charge-storage device 260. POR signals POR1-POR3 may also be at or near zero volts since there may be no power accumulated to power the power-on reset signal generator 230.

As the voltage levels of $V_{HARVEST}$ and $V_{DD}$ begin to increase (e.g., becoming more positive), the POR signals POR1 and POR3 may be held at or near zero volts (e.g. a logical '0'), and POR2 may be driven to a logical '1.' In some implementations, a logical '1' may represent a voltage greater than a threshold voltage of transistor Q8. In other implementations, a logical '1' may represent a voltage describing an opposing logic state with respect to a logical '0'. The POR signals POR1 and POR3 may enable the CNTL_OUT signal from transistor Q3 and transistor Q4 to track $V_{HARVEST}$ by causing Q3 to conduct and causing Q4 not to conduct. In addition, since POR2 is a logical '1', transistor Q8 may drive the gate of transistor Q6 low, further driving CNTL_OUT signal to the voltage level of $V_{HARVEST}$.

As the voltage levels of $V_{HARVEST}$ and $V_{DD}$ stabilize, POR1 may be driven to a logical '1', POR2 may be driven to a logical '0' and POR3 may be driven to a logical '1'. This arrangement of POR signals may enable the CNTL_IN signal to directly control the CNTL_OUT signal. Thus, signals from the harvester selector 310 (via the CNTL_IN signal) may control the associated transistor directly via the CNTL_OUT signal.

The arrangement of transistors Q3-Q13 of FIG. 4 is meant to be illustrative rather than restrictive. Persons having skill in the art will recognize that other equivalent arrangements of transistors are possible that provide a similar functionality with respect to the transistor controller 400. In some other implementations, the transistor controller 400 may include more or fewer transistors. In still other implementations, different types of transistors may be used.

Figure 5:
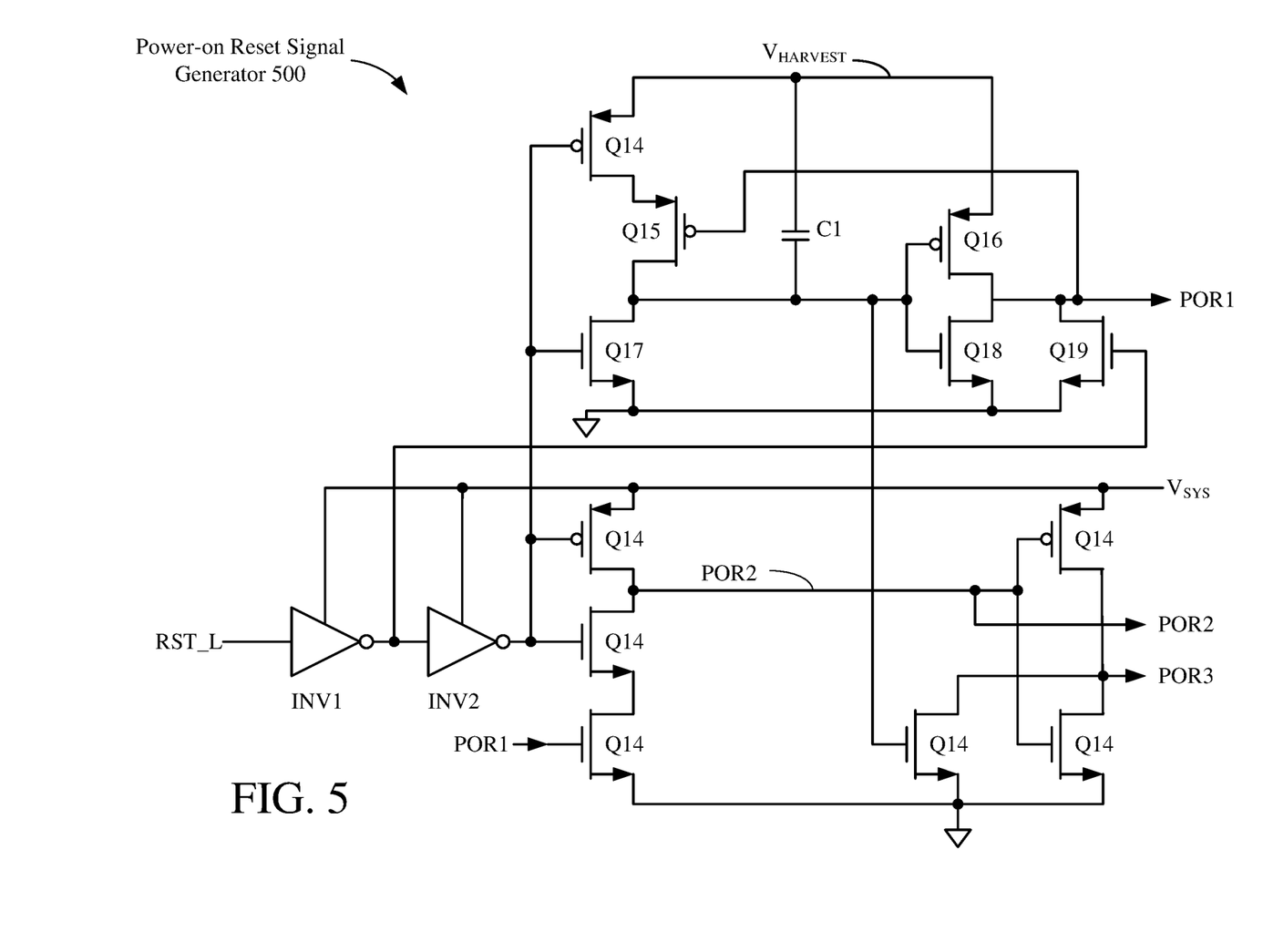
FIG. 5 is a simplified schematic diagram of the power-on reset signal generator of FIG. 2.

FIG. 5 is a simplified schematic diagram of a power-on reset signal generator 500. The power-on reset signal generator 500 may be an implementation of the power-on reset signal generator 230 of FIG. 2. The power-on reset signal generator 500 may include a capacitor C1, transistors Q14-Q25, and inverters INV1 and INV2. The power-on reset signal generator 500 may receive a reset signal (RST_L) and generate the POR signals POR1-POR3. The reset signal RST_L may be an active-low reset signal, and may be generated by any feasible method. In one implementation, the reset signal RST_L may be asserted (e.g., driven to a logic low) for a predetermined amount of time and thereafter deasserted (e.g., driven to a logic high). In some other implementations, the reset signal RST_L may be generated by dedicated circuitry (not shown for simplicity) that is sensitive to power supply ($V_{HARVEST}$, $V_{SYS}$, and/or $V_{DD}$) voltage. Thus, the reset signal RST_L may be asserted (driven to a logical '0') for a time period after power supply voltages become stable. In some implementations, RST_L may be asserted until both $V_{DD}$ and $V_{SYS}$ rise above a threshold level.

The transistors Q14-Q19 and capacitor C1 may be powered substantially by $V_{HARVEST}$ and inverters INV1 and INV2, and transistors Q20-Q25 may be powered substantially by $V_{SYS}$. When the voltage level of $V_{HARVEST}$ is low, POR1 also may be low (a logical '0'). As the voltage level of $V_{HARVEST}$ increases, and while the voltage level of $V_{SYS}$ remains at or near zero volts, POR1 may remain a logical '0'. Note that since the first voltage regulator 240 is powered by $V_{HARVEST}$, the voltage level of $V_{SYS}$ may lag behind (rise from zero volts and become stable) for a time period after the voltage level of $V_{HARVEST}$ reaches the first voltage regulator 240. Accordingly, the inverters INV1 and INV2 as well as transistors Q20-Q25 may not be operable as the voltage level of $V_{SYS}$ becomes stable. Thus, POR2 and POR3 are a logical '0'.

As the voltage level of $V_{HARVEST}$ continues to increase, the voltage level of $V_{SYS}$ also may begin to increase, and RST_L may remain asserted because, for example, the voltage level of $V_{SYS}$ may not yet be stable and/or the voltage level of $V_{DD}$ still be increasing. The inverter INV1 may cause transistor Q19 to drive POR1 to logical '0'. In addition, transistor Q24 may drive POR3 to a logical '0', and transistor Q20 may drive POR2 to a logical '1'. Finally, as the reset signal RST_L is deasserted (e.g., transitions from a logical '0' to a logical '1'), transistor Q16 may drive POR1 to a logical '1', transistors Q22 and Q23 may drive POR2 to a logical '0', and transistor Q21 may drive POR3 to a logical '1'. Table 1 below summarizes states of POR signals POR1-POR3 based on operating conditions.

TABLE 1

| Operating Conditions | POR1 state | POR2 state | POR3 state |
|---|---|---|---|
| $V_{HARVEST} = V_{SYS} = 0$<br>RST_L = asserted | logical '0' | logical '0' | logical '0' |
| $V_{HARVEST}$ increasing<br>$V_{SYS} = 0$<br>RST_L = asserted | logical '0' | logical '0' | logical '0' |
| $V_{HARVEST}$ stable<br>$V_{SYS}$ and/or $V_{DD}$ increasing<br>RST_L = asserted | logical '0' | logical '1' | logical '0' |
| $V_{HARVEST}$ stable<br>$V_{DD}/V_{SYS}$ stable<br>RST_L deasserted | logical '1' | logical '0' | logical '1' |

The arrangement of transistors Q14-Q25, capacitor C1, inverter INV1 and inverter INV2 of FIG. 5 is meant to be illustrative rather than restrictive. Persons having skill in the art will recognize that other equivalent arrangements of transistors, inverters, and capacitors are possible.

Figure 6:
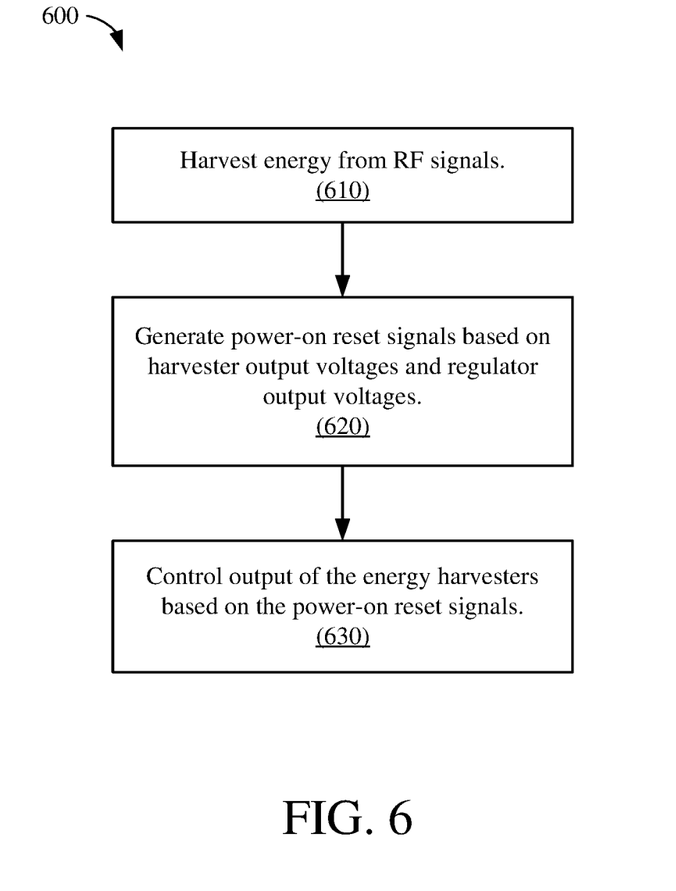
FIG. 6 is a flowchart depicting an example operation for operating a client device, in accordance with some embodiments.

FIG. 6 is a flowchart depicting an example operation 600 for operating a client device, in accordance with some embodiments. Although described herein as being performed by the client device 200 of FIG. 2, the operation 600 may be performed by the client device 120 or the client device 130 of FIG. 1, or by any other suitable device. The operation begins as the client device 200 harvests energy from RF signals (610). In some implementations, the client device 200 may be powered solely or substantially by one or more power harvesters such as the power harvesters 215 and 216 of FIG. 2. In some implementations, the first power harvester 215 may generate a first unregulated voltage and the second power harvester 216 may generate a second unregulated voltage.

Next, the client device 200 generates power-on reset signals based on harvester output voltages and regulator output voltages (620). For example, POR signals POR1-POR3 may be generated by the power-on reset signal generator 500 as described above with respect to FIG. 5. Thus, operating conditions (e.g., voltages such as $V_{HARVEST}$, $V_{SYS}$ and $V_{DD}$) may determine the state of the POR signals POR1-POR3. In some implementations, the POR signals POR1-POR3 may be generated as summarized in Table 1.

Next, the client device 200 controls output of the power harvesters based at least in part on the power-on reset signals (630). As described above with respect to FIGS. 2-3, the switch controller 220 may couple and/or isolate the first power harvester 215 and the second power harvester 216 to and from the charge-storage device 260 via the first transistor Q1 and the second transistor Q1, respectively. In some implementations, the switch controller 220 may be controlled at least in part by the POR signals POR1-POR3, the first unregulated voltage from the first power harvester 215, the second unregulated voltage from the second power harvester 216, RF envelope information associated with the first power harvester 215, and RF envelope information associated with the second power harvester 216.

In the foregoing specification, the example embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. An apparatus comprising:
a first power harvester configured to generate a first unregulated voltage from a first radio-frequency (RF) signal within a first range of frequencies;
a second power harvester configured to generate a second unregulated voltage from a second RF signal within a second range of frequencies different from the first range of frequencies;
a reset signal generator configured to generate a sequence of reset signals; and
a switch controller configured to selectively couple the first power harvester and the second power harvester to a charge-storage device based at least in part on the first unregulated voltage, the second unregulated voltage, and the sequence of reset signals.

2. The apparatus of claim 1, further comprising a first voltage regulator coupled to the charge-storage device and configured to generate a first regulated voltage.

3. The apparatus of claim 2, wherein the sequence of reset signals is based at least in part on the first regulated voltage.

4. The apparatus of claim 2, further comprising a second voltage regulator configured to generate a second regulated voltage based on the first regulated voltage, wherein the switch controller is further configured to couple the first power harvester and the second power harvester to the charge-storage device based at least in part on the second regulated voltage.

5. An apparatus comprising:
a first power harvester configured to generate a first unregulated voltage from a first radio-frequency (RF) signal;
a second power harvester configured to generate a second unregulated voltage from a second RF signal;
a reset signal generator configured to generate a sequence of reset signals; and a switch controller configured to selectively couple the first power harvester and the second power harvester to a charge-storage device based at least in part on the first unregulated voltage, the second unregulated voltage, and the sequence of reset signals, wherein the sequence of reset signals is determined at least in part by the first unregulated voltage.

6. The apparatus of claim 1, further comprising:
a first transistor configured to selectively couple the first power harvester to the charge-storage device based on a first control signal; and
a second transistor configured to selectively couple the second power harvester to the charge-storage device based on a second control signal.

7. The apparatus of claim 1, wherein the switch controller is further configured to provide either the first unregulated voltage or the second unregulated voltage to the charge-storage device based on respective magnitudes of the first and second unregulated voltage.

8. The apparatus of claim 7, wherein the switch controller is further configured to:
provide the first unregulated voltage to the charge-storage device when a magnitude of the first unregulated voltage is greater than a magnitude of the second unregulated voltage; and
provide the second unregulated voltage to the charge-storage device when the magnitude of the first unregulated voltage is not greater than the magnitude of the second unregulated voltage.

9. The apparatus of claim 1, wherein the switch controller is further configured to:
isolate the first power harvester from the charge-storage device when a magnitude of the second unregulated voltage exceeds a magnitude of the first unregulated voltage by at least a threshold amount; and
isolate the second power harvester from the charge-storage device when the magnitude of the first unregulated voltage exceeds the magnitude of the second unregulated voltage by at least the threshold amount.

10. The apparatus of claim 1, wherein the switch controller is further configured to:
couple the first power harvester and the second power harvester to the charge-storage device based at least in part on an RF envelope information associated with the first power harvester and the second power harvester.

11. The apparatus of claim 1, wherein the switch controller is further configured to:
isolate the first power harvester from the charge-storage device when an RF envelope magnitude associated with the second power harvester exceeds an RF envelope magnitude associated with the first power harvester by at least a threshold amount; and
isolate the second power harvester from the charge-storage device when the RF envelope associated with the first power harvester exceeds the RF envelope associated with the second power harvester by at least the threshold amount.

12. The apparatus of claim 1, wherein the first power harvester is configured to generate the first unregulated voltage from RF signals within a first range of power levels and the second power harvester is configured to generate the second unregulated voltage from RF signals within a second range of power levels different from the first range of power levels.

13. The apparatus of claim 5, further comprising:
a first transistor configured to selectively couple the first power harvester to the charge-storage device based on a first control signal; and
a second transistor configured to selectively couple the second power harvester to the charge-storage device based on a second control signal.

14. A method comprising:
generating, by a first power harvester, a first unregulated voltage from a first radio-frequency (RF) signal within a first range of frequencies;
generating, by a second power harvester, a second unregulated voltage from a second RF signal within a second range of frequencies different from the first range of frequencies;
generating, by a reset signal generator, a sequence of reset signals; and
coupling the first power harvester and the second power harvester to a charge-storage device based at least in part on the first unregulated voltage, the second unregulated voltage, and the sequence of reset signals.

15. The method of claim 14, further comprising:
coupling the first unregulated voltage to the charge-storage device when a magnitude of the first unregulated voltage is greater than a magnitude of the second unregulated voltage; and
coupling the second unregulated voltage to the charge-storage device when the magnitude of the first unregulated voltage is greater than the magnitude of the second unregulated voltage.

16. The method of claim 15, further comprising:
isolating the first power harvester from the charge-storage device when a magnitude of the second unregulated voltage exceeds a magnitude of the first unregulated voltage by at least a threshold amount; and
isolating the second power harvester from the charge-storage device when the magnitude of the first unregulated voltage exceeds the magnitude of the second unregulated voltage by at least the threshold amount.

17. The method of claim 15, further comprising:
coupling the first power harvester and the second power harvester to the charge-storage device based at least in part on an RF envelope information associated with the first power harvester and the second power harvester.

18. The method of claim 15, further comprising:
isolating the first power harvester from the charge-storage device when an RF envelope magnitude associated with the second power harvester exceeds an RF envelope magnitude associated with the first power harvester by at least a threshold amount; and
isolating the second power harvester from the charge-storage device when the RF envelope associated with the first power harvester exceeds the RF envelope associated with the second power harvester by at least the threshold amount.

19. The method of claim 15, further comprising:
generating, by a first voltage regulator coupled to the charge-storage device, a first regulated voltage, wherein the sequence of reset signals is based at least in part on the first regulated voltage.

20. An apparatus comprising:
means for generating a first unregulated voltage from a first radio-frequency (RF) signal within a first range of frequencies via a first power harvester;

means for generating a second unregulated voltage from a second RF signal within a second range of frequencies different from the first range of frequencies via a second power harvester;

means for generating a sequence of reset signals; and means for coupling the first power harvester and the second power harvester to a charge-storage device based at least in part on the first unregulated voltage, the second unregulated voltage, and the sequence of reset signals.

21. The apparatus of claim 20, further comprising:

means for coupling the first unregulated voltage to the charge-storage device when a magnitude of the first unregulated voltage is greater than a magnitude of the second unregulated voltage; and means for coupling the second unregulated voltage to the charge-storage device when the magnitude of the first second unregulated voltage is not greater than the magnitude of the second unregulated voltage.

22. The apparatus of claim 20, further comprising:

means for coupling the first power harvester and the second power harvester to the charge-storage device based at least in part on an RF envelope information received by the first power harvester and the second power harvester.

23. An apparatus comprising:

means for generating a first unregulated voltage via a first power harvester;

means for generating a second unregulated voltage via a second power harvester;

means for generating a sequence of reset signals;

means for coupling the first power harvester and the second power harvester to a charge-storage device based at least in part on the first unregulated voltage, the second unregulated voltage, and the sequence of reset signals;

a first transistor configured to selectively couple the first power harvester to the charge-storage device based on a first control signal; and a second transistor configured to selectively couple the second power harvester to the charge-storage device based on a second control signal.

24. The apparatus of claim 23, wherein the first unregulated voltage is generated based on a first radio-frequency (RF) signal within a first range of frequencies, and the second unregulated voltage is generated from a second RF signal within a second range of frequencies different from the first range of frequencies.

* * * * *